US006918831B2

(12) United States Patent
Nguyen et al.

(10) Patent No.: US 6,918,831 B2
(45) Date of Patent: Jul. 19, 2005

(54) METHOD AND APPARATUS FOR INDEPENDENTLY VERIFYING GAME OUTCOME

(75) Inventors: Binh T. Nguyen, Reno, NV (US); Craig A. Paulsen, Reno, NV (US)

(73) Assignee: IGT, Reno, NV (US)

(*) Notice: Subject to any disclaimer, the term of this patent is extended or adjusted under 35 U.S.C. 154(b) by 0 days.

(21) Appl. No.: 10/243,464

(22) Filed: Sep. 13, 2002

(65) Prior Publication Data

US 2004/0053675 A1 Mar. 18, 2004

(51) Int. Cl.[7] .......................... A63F 9/24; G06F 19/00; G06F 17/00

(52) U.S. Cl. ............................. 463/20; 463/42; 463/16

(58) Field of Search ............................. 463/16, 20, 29, 463/24, 43; 273/143 R

(56) References Cited

U.S. PATENT DOCUMENTS 4,283,709 A 8/1981 Lucero et al.
5,917,725 A * 6/1999 Thacher et al. ............... 700/91
5,970,143 A * 10/1999 Schneier et al. ............ 713/181
6,071,190 A * 6/2000 Weiss et al. .................. 463/25
6,379,245 B2 * 4/2002 De Keller ..................... 463/13
6,477,251 B1 * 11/2002 Szrek et al. .................. 380/46
6,577,733 B1 * 6/2003 Charrin ...................... 380/251
6,595,856 B1 * 7/2003 Ginsburg et al. ............. 463/29

* cited by examiner

*Primary Examiner*—Julie Brocketti
(74) *Attorney, Agent, or Firm*—Marshall, Gerstein & Borun LLP

(57) ABSTRACT

A method is provided for verifying the outcome of a game presented at a gaming device. The method includes the step of collecting game play information, including information regarding each input by a player of the game and all generated game data. Collected information is stored in a session file pertaining to the game. In one embodiment, the session file includes captured data fields. Collected information is associated with these data fields. The session file may be stored in a memory device associated with the gaming device. After play of the game, the collected information may be used to recreate or replay the game, such as for verifying the outcome of the game. In one embodiment, the gaming device comprises a player's computer which is in communication with a remote game server via a communication link, such as including the Internet.

21 Claims, 2 Drawing Sheets

METHOD AND APPARATUS FOR INDEPENDENTLY VERIFYING GAME OUTCOME

FIELD OF THE INVENTION

The present invention relates to gaming machines, and more particularly to methods and apparatus for determining the outcome of a game played on a gaming machine.

BACKGROUND OF THE INVENTION

A variety of gaming devices currently exist for presenting games of skill and/or chance to a player. These games are presented based upon a wager placed by the player and provide the opportunity for the player to be paid winnings if the outcome of the game is a particular outcome.

One particular type of gaming machine is known as a "video" machine, as the machine includes a video display. Play of the game involves display of information, such as images of cards or other symbols by the display. If the outcome of a game which is played is a winning outcome, then the player may be awarded a winning. These types of gaming devices are computer controlled, with a controller generating game information, including image information which is displayed by the display.

Unfortunately, circumstances arise when a player may believe that the outcome of the game is a winning outcome, while the gaming device indicates the contrary. This may give rise to a dispute between the player and the game operator, such as a casino or gaming company.

A variety of circumstances may arise in which there is a dispute regarding the outcome of the game. In general, these disputes are undesirable, since negative publicity may be generated regarding the game operator's alleged non-payment to the player. On the other hand, the game operator is only obligated to pay winnings when the outcome of the game is truly a winning outcome. In some circumstances, unscrupulous players may actually allege that the outcome of the game was a winning outcome when it was not at any time, in an attempt to extort monies from the gaming operator.

Unfortunately, no means currently exists for accurately monitoring or verifying the operation of the gaming machine. For example, the game operator may obtain data regarding the play of the game from the gaming controller. However, if a malfunction occurred, the data is itself might be corrupt and only indicate the malfunction. Other security measures are easily thwarted, by unscrupulous players. For example, gaming personnel may attempt to watch various gaming machines, but they can not watch all of the machines all of the time, and players may attempt to block the view of the machine if they attempt to tamper with it.

A means for verifying the outcome or condition of a gaming machine is desired.

SUMMARY OF THE INVENTION

The present invention comprises methods and apparatus for verifying the outcome of a game presented at a gaming device. In one embodiment, the method includes the steps of collecting data pertaining to the presentation of the game at the gaming device, the data including one or more inputs by a player of the gaming machine playing the game; storing the collected data; and utilizing the data to replay the game at a later time.

In one embodiment, the method includes the step of generating a session file, the session file having a plurality of captured data fields corresponding to a plurality of data fields. In this embodiment, the step of collecting data comprises determining data which satisfies one or more of the data fields and the step of storing comprises associating the data with the captured data field associated with the one or more data fields. The data fields may be varied, and include fields such as the identity of the player, random numbers generated to determine the outcome of the game, the size of a bet placed by the player, and others.

In one embodiment, the gaming device may include a diagnostic function and the step of utilizing the data may comprise utilizing the diagnostic function to replay the game at the gaming device. In another embodiment, the collected data may be transmitted to a remote location. The remote location may comprise a laptop or other portable device. The remote location may also be a remote station, such as a casino backroom. The information may be used at the portable device or remote location to replay or recreate the game. In one embodiment, the game may be replayed in continuous or single stepped modes, in fast forward, rewind, slow forward, paused, stopped or other modes.

In one embodiment, the data may be stored at the gaming device, such as in a memory device. In another embodiment, the information may also or, in the alternative, be stored at a remote location. In one embodiment, the method includes the step of providing the information to the player so that they player may replay the game, such as for the purpose of analyzing their play strategy. In one embodiment, the data may be mined by casino or other entity to determine a player's style and habit for the purpose of marketing, game selection and other purposes.

The method may be implemented in a wide variety of environments. In one embodiment, the method may be implemented at a gaming machine of a type utilized at a casino. In this embodiment, the data may be stored at the gaming machine where the game is presented. In another embodiment, the gaming device may comprise a computer belonging to a player which is in communication with a game server or host via a communication link, such as including the Internet.

In accordance with the invention data, such as in the form of a session file, is collected and stored. This information may be used at a later time to recreate or replay the game which was played. In one embodiment, the information which is collected and stored includes information regarding the identity of the player of the game (such as obtained from a player tracking card or system), information regarding each and every input by the player (such as button pushes, keystrokes, arm pulls, bets and the like), and all information generated by the gaming device or machine (such as random numbers defining game outcomes, winning payouts and the like). Using this information, the complete game may be recreated or replayed, one step at a time. By replaying the game, the outcome of the game may be verified, a game malfunction may be identified or the like.

Further features, and advantages of the present invention over the prior art will become apparent from the detailed description of the drawings which follows, when considered with the attached figures.

DETAILED DESCRIPTION OF THE INVENTION

In one or more embodiments, the invention comprises a method of verifying the outcome of a game, and in one embodiment, a gaming machine which includes at least one gaming machine condition data collection device. In the following description, numerous specific details are set forth in order to provide a more thorough description of the present invention. It will be apparent, however, to one skilled in the art, that the present invention may be practiced without these specific details. In other instances, well-known features have not been described in detail so as not to obscure the invention.

In general, the present invention comprises a gaming machine including at least one data collection device configured to collect data regarding the operation of the gaming machine, and more particularly, data useful in verifying the outcome of a game played on the machine.

One embodiment of the invention is applicable to gaming machines of the type which are utilized at casinos and similar establishments. Other embodiments of the invention are applicable to computers and similar devices which permit a player to play a game from a remote location, such as over the Internet or other communication link to a remote server.

Figure 1:
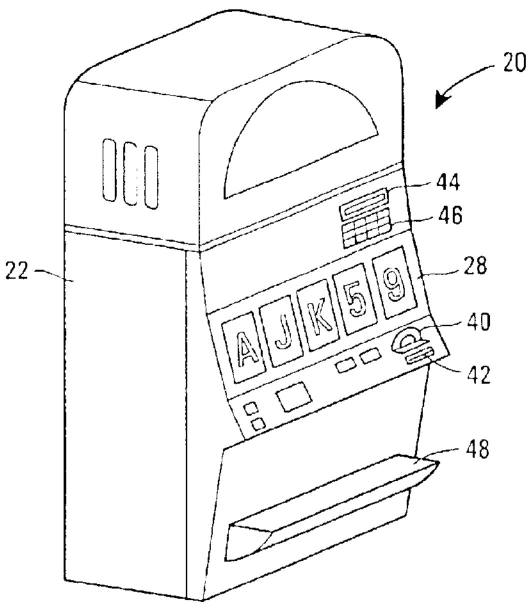
FIG. 1 is a perspective view of a gaming machine comprising one environment for an apparatus and method of the present invention.

A particular embodiment of the invention which is most applicable to gaming machines or devices of the type utilized in casinos will be described with reference to FIGS. 1 and 2. Referring to FIG. 1, there is illustrated one embodiment of a gaming machine 20 in accordance with the present invention. In general, the gaming machine 20 is adapted to present at least one game for play to a player. As illustrated, the gaming machine 20 includes a housing 22 which supports and/or houses the various components of the gaming machine 20.

In one embodiment, the gaming machine 20 is a "video" type machine in which game information is displayed to a player. In this regard, the gaming machine 20 includes a display 28. The display 28 may be of a variety of types, as is known, such as CRT, LCD, plasma and the like.

The gaming machine 20 includes a variety of controls and other features for presenting a game utilizing the display 28. In one or more embodiments of the invention, the gaming machine 20 is adapted to present a wager-type game. In this arrangement, a player is required to place a bet or wager in order to participate in the game. In the event the outcome of the game is a winning outcome, then the player may be provided with an award. In one arrangement, the award may be winnings based upon the amount wagered or bet by the player.

In order to accept a wager, the gaming machine 20 may include a value input device such as a coin acceptor 40 for accepting coins. The gaming machine 20 may also include a value input device in the form of a bill acceptor or validator 42 for accepting paper currency. The gaming machine 20 may be provided with other means for accepting or verifying value, such as a credit card reader.

In one embodiment, the gaming machine 20 may include a value input device in the form of a card reader 44 for reading credit cards and/or player tracking cards. A keypad 46 or other input device may also be provided which permits a player to enter information, such as player identification information such as a password or PIN. Such player tracking devices, including various input devices which may be employed are well known.

The gaming machine 20 may include a variety of player input devices. For example, push-type buttons or other input accepting elements may be provided. A player may utilize these buttons to place bets, initiate games and the like. Such input devices and the their operation is well known.

In one embodiment of the game, a player may be awarded a prize or payout if the outcome of the game comprises a predetermined winning outcome. In one embodiment, the award may be paid in coins, such as to a coin tray 48. In other embodiments, the award may be paid as a ticket, electronically indicated credit or the like.

It should be understood that the gaming machine 20 may be adapted to present one or more of a wide variety of games. Depending upon the game presented, the configuration of the machine may vary.

In one embodiment, a controller (not illustrated) is used to control the display 28, including the information displayed thereon. The controller may be a computing device which is located at the gaming machine 20, remote from the gaming machine, or include components both at the gaming machine and remote from the gaming machine. The controller is preferably arranged to generate game data, such as data which is used by the display 28 to display information. The generated data, including in response to player inputs, determines the outcomes of games.

As indicated, in accordance with the invention, the gaming machine 20 includes at least one data collection device. In one embodiment, the data collection device comprises a means for verifying the outcome of a game played on the gaming machine 20. In a preferred embodiment of the invention, this means is independent of the gaming controller. Preferably, the means comprise a memory for storing game play information.

Figure 2:
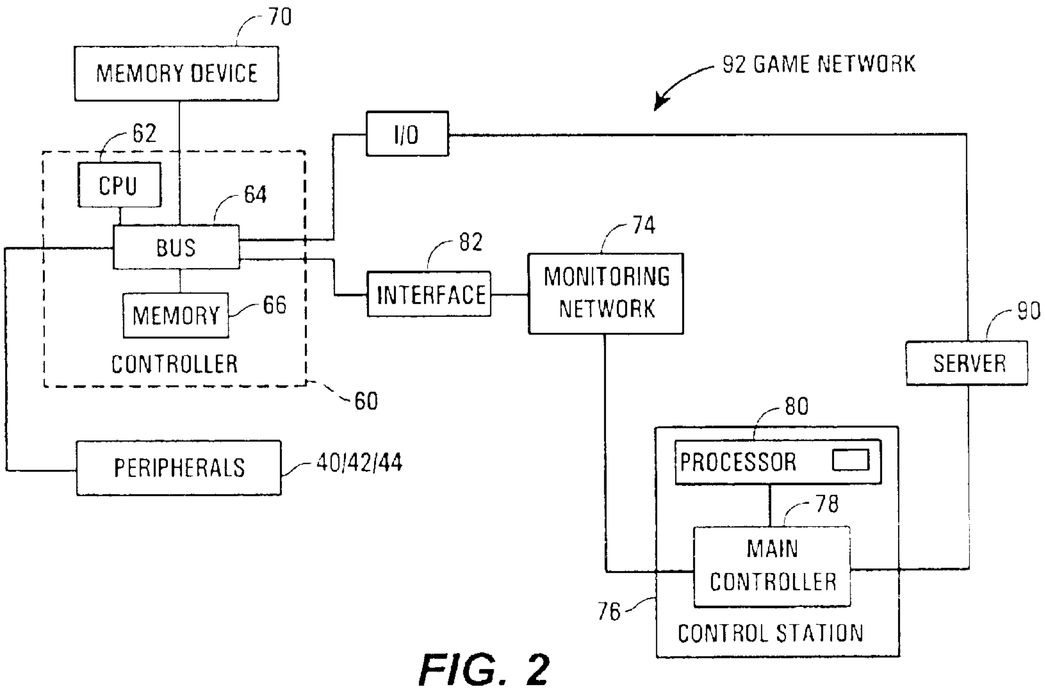
FIG. 2 is a schematic illustrating a control and monitoring system for a gaming machine including a data collection device in accordance with the invention.

One embodiment of the invention is illustrated in FIG. 2. As illustrated, the gaming machine 20 includes a controller 60. The controller 60 may have a wide variety of configurations. In one embodiment, the controller 60 includes a CPU 62 which is capable of executing computer readable program code.

The controller 60 includes a bus 64. The bus may be of a variety of types. In one embodiment, the bus is a bi-directional system bus which may contain, for example, thirty-two address lines for addressing a video memory or main memory. The bus may preferably also include a thirty-two or sixty-four bit data bus for transferring data between the components associated with the bus. Alternatively, multiplex data/address lines may be used instead of separate data and address lines.

The controller 60 may include a memory 66. The memory 66 may a variety of devices, including RAM, EEPROM or other flash memory. Preferably, the memory 66 is rewriteable. The memory 66 is configured to store data, and more preferably computer code for execution by the CPU 62.

The CPU 62 and memory 66 are coupled to the bus 64. This coupling permits data to be transferred between the devices.

In one embodiment, various peripherals of the gaming machine 20 are also connected to the bus 64. For example, the coin acceptor 40, bill validator 42 and other devices of the gaming machine, including the display 28, are coupled to the bus 66. This permits, for example, control instructions to be provided by the controller 60 to the peripheral, and for the output of the peripheral to be provided to the controller 60. For example, the input of a player's money is indicated by the bill validator 42 to the CPU 62, which may then cause the display 28 to display information regarding the number of credits credited to the player.

The data collection device may comprise a memory device 70, such as RAM, EEPROM or other flash memory which is also associated with the bus 64. The data collection device may also comprise a mass storage media such as a disk drive (semiconductor or magnetic type), DVD, CD or other device now known or later developed. In general, the memory device 70 is configured to store data regarding events associated with the play of a game at the gaming machine, including game information generated by the CPU 62 and information input to the controller 60 from the peripheral devices.

Figure 3:
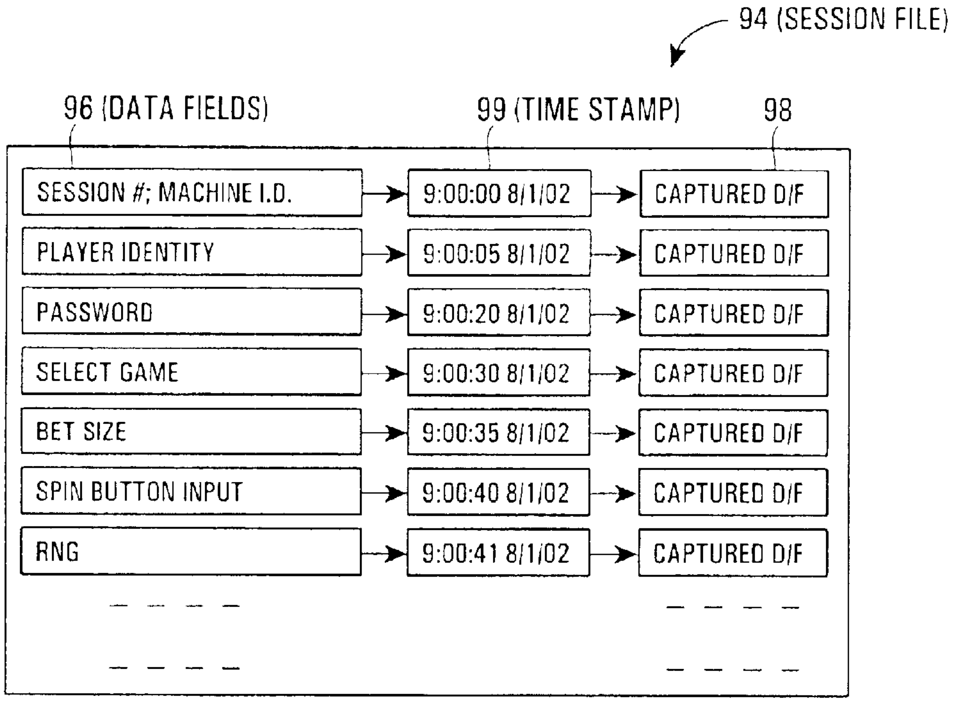
FIG. 3 is a schematic illustrating a session file in accordance with the present invention.

In a preferred embodiment, the information which is stored is data which may be used to re-create or generate the game play occurring at the gaming machine. In one embodiment, the information comprises data stored in a session file. One embodiment of such a file is illustrated in FIG. 3. As illustrated, the session file 94 includes a plurality of defined data fields 96 and a plurality of captured data fields 98.

The particular data fields 96 may vary. As illustrated, data fields 96 may include, but are not limited to, password, game selected, size of bet, number of lines bet, denomination of bet ($0.05, $0.25, etc.), buttons pushed, coins paid, and random numbers generated (RNG). In a preferred embodiment, time of event information is associated with each data event. The time of event information may comprise a time stamp 99 comprising date and/or time information. In one embodiment, the data fields 96 may include data regarding other events, such as security events comprising opening of a gaming machine door, a tilt or other malfunction or other system activities/anomalies. In general, the data fields which are selected preferably comprise fields which, when filled, are useful in recreating the operation of the gaming machine. The particular titles of the data fields 96 may also vary.

Although not illustrated, the gaming machine 20 may be configured to present a secondary or bonus game or event. For example, upon receiving a particular winning outcome playing a main game of slots, a bonus wheels may be activated. This bonus wheel may spin and then stop, the stopping position indicating a bonus winning amount to which the player is entitled. Other types of secondary or bonus games and events are known, including those which utilize video displays or other mechanical or electromechanical devices.

In one embodiment of the invention, the data fields 96 may thus include information regarding such a secondary or bonus event/game. Such data fields may include an internally generated bonus result (when the result of the bonus game or event is generated at the gaming machine) or an externally generated bonus result (such as when the result of the bonus game is generated at a remote location, such as a remote server, and transmitted to the gaming machine). These data fields may be further broken down into fields such as RNG for bonus result and bonus value (i.e. amount of award). Of course, other data fields may be utilized to track and store information regarding these secondary or bonus games/events, depending on the game or event and how it is implemented.

In a preferred embodiment of the invention, the information which is stored is associated with a particular player. In this manner, the outcome of a game or other event may be verified with respect to the player of the gaming machine when the event occurred. In one embodiment, as described above, the identity of the player may be provided by a player tracking card or the like, such as in association with a player rewards program. As described in greater detail below, in some instances the gaming machine or device may provide for other input of player identification information, such as a login name and password. In either event, in one embodiment of the invention the session file may include a data field 96 such as "login name" which may have an associated captured data field 98.

During operation of the gaming machine 20, generated and/or input data is associated with the data fields 96 by entry into the captured data fields 98. For example, when a player utilizes their player tracking card at the gaming machine 20, the player's name may be input into the captured data field 98 corresponding to the data field 96 "login name." If the player does not have a player card, data is still preferably captured and recorded in an anonymous mode. In this mode, the identity of the player is not specifically known, but the game may be identified by a session number and a time stamp.

In the preferred embodiment of the invention, the memory device 70 stores the information which represents game play activities at the gaming machine. As indicated, this information may be stored in the form of a session file 94. A session file 94 may be generated and stored regarding each game played at the gaming machine. In this configuration, multiple session files 94 are generated and stored. In another embodiment, a session file 94 is generated for each user login, and all games played by the player during that session are stored in the single session file.

Preferably, the stored information can be used to verify activities occurring at the gaming machine including, if desired, the outcome of a particular game. In one embodiment, the session file information may be utilized by a simulator or simulation program to recreate game play exactly as it occurred at the gaming machine 20. In one embodiment, this simulation program may be executed at the gaming machine 20 itself. For example, in the event of a dispute regarding the outcome of a particular game, gaming personnel may travel to the gaming machine 20 and place the gaming machine 20 in a "verification" mode. The gaming machine 20 may be caused to display the available session files. If the game outcome which is in question is the last game, then the last session file may be selected. The simulation program may then cause the gaming machine to display the game as it was played by the player, including selections made by the player and the outcome of the game. In another embodiment of the invention, the data or information may be used remotely. Additional features and aspects of the invention are detailed below.

In one or more embodiments of the invention, the memory device 70 is in communication at one or more times with one or more outside devices via a network or other communication path, such as a security/monitoring network 74. In general, in such an arrangement, data stored by the memory device 70 may be transmitted to a remote location, such as for storage and/or use. In addition, control instructions may be provided to the memory device 70 from the remote location.

In a preferred embodiment, the security network 74 includes at least one remotely located control station 76.

This station may be located in a secure area of a casino. As illustrated, the control station 76 includes a main controller/processor 78.

In one or more embodiments, the security/monitoring network 74 may be a part of another network or comprise any network. For example, the gaming machine 20 may be associated with a player tracking or reward system network for monitoring play data from a remote location. The security/monitoring network 74 may be associated with or comprise one or more portions of such a network. The security/monitoring network 74 may be associated with other devices/networks as well. For example, a portion of the security/monitoring network 74 may include an existing wide area progressive or casino accounting system/network. In this manner, additional wiring or network devices are reduced or eliminated.

In one embodiment, the control station 76 includes a processor 80 for utilizing the data provided. For example, the processor 80 may be configured to execute the script information to regenerate or re-create the game play which occurred at the gaming machine. In one embodiment, the control station 76 may include a monitor (not shown) for displaying re-generated game play information. The control station 76 may also include one or more memory devices, including mass storage devices such as hard drives, for storing information transmitted from the memory device 70.

The network 74 includes a communications link provided between the memory device 70 and the control station 76. This link may be a wired or wireless communication link. The protocol/architecture of the communications link, including interfaces associated with the camera controller 70 and control station 76 may be of a variety of types. For example, if the link is a wireless link, the protocol/architecture may be Bluetooth or IEEE 802.1x. For wired links, the protocol/architecture may be USB, RS-485, IEEE-1394 (Firewire®), Ethernet, or TCP/IP. In one embodiment, the controller 60 includes a communications interface 82 associated with the bus 64. The communication link is established with the memory device 70 through the bus 64 and communications interface 82.

As noted above, the link may be associated with or provided through another network. For example, in another embodiment illustrated in FIG. 2, game data may be generated at a remote host or game server 90. The game data may be transmitted over a game network 92. The remote station 76 may be in communication with the game server 90. In this embodiment, stored script or other data may be transmitted from the memory device 70 over the game network 92 to the remote station 76.

The link may be provided through other networks, such as a player tracking network with which the gaming machine is associated. As one example, the gaming machine 20 may include a player tracking device. The player tracking device may be a "stand-alone" or "add-on" type device which may be used with a variety of gaming machines. In one embodiment, the player tracking device may include a housing for supporting one or more elements. The player tracking device may include a card reader controlled by a controller. In one embodiment, the memory device 70 may be in communication with, including being controlled by, the controller of the player tracking device. In one embodiment, the memory device 70 may actually be part of the player tracking device itself, with data provided by the gaming machine controller 60 to the player tracking device.

The memory device may be associated with additional or other peripheral devices of the gaming machine. For example, one or more security data collection devices may be associated with a credit card reader, bill validator, cash box or the like.

In a preferred embodiment of the invention, the memory device 70 is controlled by the CPU 62 of the gaming controller 60. For example, the CPU 62 may execute code which causes data to be transmitted and stored in the memory device 70 when the data is determined to meet or comprise a particular desired data field.

In another embodiment of the invention, the memory device 70 may be controlled from a remote location. For example, the remote game server 90 may be configured to "screen" information and when information is determined to meet particular criteria, such as a particular data field, store that information at the memory device 70.

One or more methods of using the memory device 70 or other data collection device(s) associated with a gaming machine will now be described. In accordance with the method generally, the memory device 70 is configured to store information regarding activities occurring at the gaming machine.

In one embodiment, a controller, such as the CPU 62 of the gaming controller 60 or the remote game server 90, is configured to store information at the memory device 70. In other embodiments, a remote controller or a controller other than the main gaming controller 60 may effect the collection of the information. For example, a controller associated with a player tracking device of the gaming machine or a controller located remote from the machine may be configured to cause the storage/collection of information.

In one embodiment, the memory device 70 is arranged to collect game information at specific times or in response to specific events. Control may be effectuated by the controller 60, or via an outside device, as described above. In general, the memory device 70 may be configured to store data which satisfies any data field of a session file. A session file may be generated in response to any of a variety of activities, such as the depression of the "spin" or "play" button by the player which effects the start of a game, by a player inserting a player card into the gaming machine, or other actions.

In one embodiment, the operation of the memory device 70 may be controlled from the remote station 76. For example, security personnel may send commands from the remote station 76 via the network 74 to the controller 60. The controller 60 may then execute these commands. The commands may cause, for example, the memory device 70 to forward data, such as a session file 94, to the remote station 76. As one example, a governmental agency such as a gaming control board may utilize the system to collect the game play data and store it at a remote location.

In one embodiment, the information may be loaded onto a laptop or portable device. For example, in the event of a dispute regarding the outcome of a game, malfunction or for any other reason, a technician may travel to the gaming machine with a portable device. The session file information may be downloaded to the device, such as via a wired or wireless communication link. The session file may then be used, such as in a "replay" of the game or otherwise as described herein. In one embodiment, for example, the "replay" of the game may be effected on such a device when the gaming machine is an electromechanical device such as a slot machine. In such a configuration, the portable device may be configured to video-simulate the reels of the gaming machine, with the session file used to replay the game, including the spinning of the reels and their stopped positions.

As will be appreciated, over time, the amount of stored information would become excessively large, resulting in the need for a very large memory or other information storage device associated with the gaming machine. Thus, in one embodiment of the invention, stored information is over-written after a predetermined period of time or after a predetermined amount of information is stored, unless a predetermined event occurs. For example, the memory device 70 may be arranged to store a certain volume of information. Once the memory device 70 is full, the oldest data may be overwritten by newer data. In one embodiment, this may comprise the overwriting of older session files with newer session files.

As will be appreciated, depending upon the configuration or nature of the data or communication links provided, the bandwidth or total volume of information which may be transmitted over the link may be limited. In that event, it may be desirable to not have the collected security data or information continuously transmitted to the remote station. In one embodiment, the data or information may be transmitted upon request, such as described above upon a signal from the control station 76.

In another embodiment, if a "trigger" event occurs, then collected data is automatically transmitted to the control station 76. For example, in one embodiment, such a trigger event may comprise a signal from a gaming machine controller 90 to the remote station 76 of the award of a very large jackpot or a game machine malfunction. In one embodiment, each gaming machine controller 90 is arranged to send a signal representative of certain events, along with gaming machine identification information. In one embodiment, the remote station 76 is arranged to receive signals from the gaming machine controller 90, such as through a communication interface with the game machine network 92.

It will be appreciated that a wide variety of systems and devices may be utilized to accomplish the method(s).

Figure 4:
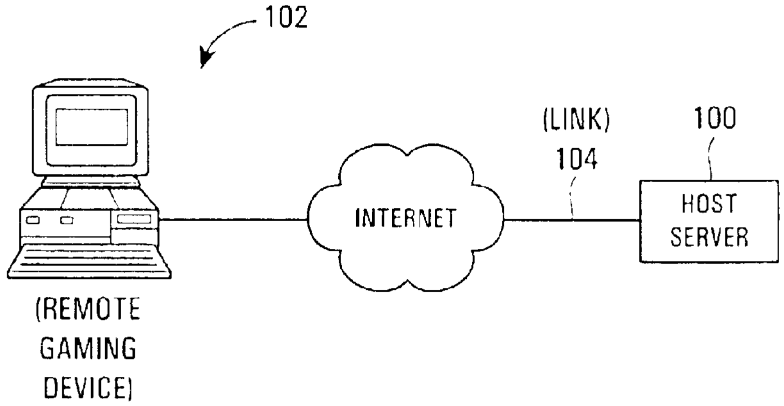
FIG. 4 illustrates another gaming environment for an apparatus and method of the invention.

It will be appreciated that the present invention may be applied to a wide variety of gaming environments. FIG. 4 illustrates another gaming environment. As illustrated, a host or server 100 and a remote gaming device 102 are connected by a communication link 104. In one embodiment, the host or server 100 may comprise a game server. The remote gaming device 102 may comprise, for example, a player's home computer. The communication link 104 may comprise a dedicated link, or be part of a packet switched network or otherwise. The link 104 may comprise wired links, wireless links or combinations thereof. In one embodiment, the link 104 may include the Internet.

In this embodiment, inputs by the player at their remote computer are stored at the server 100 in a session file, as well as information generated at the server 100. Thus, in like fashion to that detailed above, a session file is generated which may be used to entirely re-create game play, including the outcome of a particular game. A particular aspect of this embodiment of the invention is that the multiple players and multiple games may readily be tracked and stored for replay, verification and the like, all from a single, central location.

In this configuration, a wide variety of information may be collected at the remote computer. This information may include generated random numbers used to determine the outcome of a game, and player's keyboard strokes or other inputs. This information may be collected and then transmitted to the remote server, or transmitted immediately and then collected at the remote server.

The invention has many advantages. A primary advantage to the invention is that information is stored which can be used to determine the outcome of a game or other gaming-related event, whether occurring at a stand-alone type gaming machine, a gaming machine which is part of a network, or as described above, a game played over a network between two computing devices. The information may be used for a variety of purposes, and particularly to verify a particular game outcome.

In one embodiment, the invention provides for the "replay" of the play of a particular game. As indicated, in one embodiment, in order to verify the outcome of a game, session file information may be used to actually re-create the play of the game. This may be used to resolve a dispute with a player or determine the source of a game malfunction or the like. One advantage of the invention is that visual verification of the outcome is provided by such a replay.

The data of the invention may be used to replay or recreate the game in various modes. For example, a game may be replayed in a real-time continuous mode. The game may also be replayed in a frame-by-frame or per action mode. Various replay features such fast forward, slow forward, rewind, pause and stop may be provided. These and other features may be used to analyze/review the game information.

In one embodiment of the invention, the information may be provided to a player. For example, a player who is a member or a player slot or other rewards program of a casino may be provided with the opportunity to utilize the information to "replay" their previous games. This information may be helpful, for example, to a player attempting to improve their card play or the like.

One aspect of the invention is that information is obtained and stored which may be used for a variety of purposes other than "replay" or game verification. For example, session file information may be uploaded to a player tracking system for use in analyzing a player's play habits, including specific play strategies. Searches may be conducted through the information, or the information aggregated or otherwise manipulated. A casino may use this information, for example, to make selections regarding gaming machines to locate in the casino, or for directing marketing to the player.

In this regard, as one aspect of the invention, the information which is stored may be mapped or associated with a particular player. As indicated, in one embodiment, the stored information may include player identification information. In this manner, the identity of the player of a particular game may be verified. For example, in the case of a large jackpot, not only may the outcome of the game be verified, but so may be the identity of the player who is attempting to collect the jackpot against the identity of the player who was identified as the player of the game.

A particular advantage of the invention is that these features are provide while only a small amount of information is stored. For example, in the case of a video-type machine, screen information might be stored to verify the displayed outcome of a game. Assuming only VGA screen display settings, a few seconds of such video data might comprise 30–40 Mb of data. The storage of such information would be prohibitive from a data storage perspective, and still does not provide the features of the invention.

In the present invention, an entire session file might be only 100b. Thus, using only a small memory device, multiple session files may be stored.

The session information may be stored in a format which is platform independent. In this manner, the session information may be used at a wide variety of devices, or a single device may utilize session information from a wide variety of machines.

As indicated above, in a preferred embodiment, each action by a player and each action by the gaming machine (including keystrokes, random number generator results, etc.) which is associated with the play of the game is tracked and stored. As indicated, this permits not only verification of the outcome of a particular game, but also allows for verification of each and every event or step during the sequence of game play. For example, the player's selection of cards to be held may be verified, as well as the final hand after replacement cards have been dealt in a game of video poker. In the case of a game malfunction, each and every step leading up to the malfunction may be reviewed to aid in determining the cause of the malfunction.

It will be understood that the above described arrangements of apparatus and the method therefrom are merely illustrative of applications of the principles of this invention and many other embodiments and modifications may be made without departing from the spirit and scope of the invention as defined in the claims. Features of the invention described herein may be provided alone or in any combination.

We claim:

1. A method of verifying the outcome of a game played on a casino gaming machine located in a casino, the method comprising:

collecting payment from a player through a value input device of said casino gaming machine, wherein said casino gaming machine is located in said casino; the gaming machine comprising a gaming controller, a bus, a first memory for storing software for operating one or more games on said machine, a separate memory device, the first memory, controller and separate memory device all being linked to the bus, the bus also being linked to a control station controller located in said casino but at a remote location from said machine, collecting game data pertaining to events occurring at said gaming machine associated with the presentation and play of a game at said machine, said game data including one or more inputs by said player of said gaming machine playing said game;

storing said game data in said separate memory device and devoting said separate memory device only to said game data;

analyzing said game data to determine if a triggering event has occurred, and, if a triggering event has occurred, sending said game data to said control station controller for replay of said game at said control station controller, wherein triggering events include gaming machine malfunctions and jackpots exceeding a predetermined value; and in the event no triggering event occurs, utilizing said data to replay said game at a later time at said machine in said casino upon request by a player or casino representative.

2. The method in accordance with claim 1 including the step of generating a session file, said session file having a plurality of captured data fields corresponding to a plurality of data fields, said step of collecting data comprising the step of determining data which satisfies one or more of said data fields, and said step of storing comprises associating said data with the captured data field associated with said one or more data fields, and said step of storing said data comprising storing said session file on said separate memory device.

3. The method in accordance with claim 1 wherein one of said data fields comprises the identity of said player.

4. The method in accordance with claim 1 wherein said gaming machine includes a diagnostic function and said step of utilizing said data comprises utilizing said diagnostic function to replay said game at said gaming machine.

5. The method in accordance with claim 1 including the step of transmitting said game data through the bus to the control station controller or a server linked to the control station controller.

6. The method in accordance with claim 5 including the step of storing said game data on said server or said control station controller.

7. The method in accordance with claim 5 including the step of providing said game data to said player and wherein said utilizing step comprises said player utilizing said game data to replay said game.

8. The method in accordance with claim 1 wherein said casino gaming machine comprises a slot machine having one or more rotatable reels.

9. The method in accordance with claim 1 wherein said casino gaming machine includes at least one video display for presenting game information.

10. The method in accordance with claim 1 wherein said inputs by said player include reading of a player card.

11. The method in accordance with claim 1 wherein said inputs by said player comprise one or more inputs selected from the group consisting of hold, discard, coins in, credits bet, spin, deal and cash out.

12. A method of confirming the play of a game presented at a casino gaming machine comprising a value input device, said machine being located in a casino, the method comprising of:

collecting payment from a player through said value input device of said casino gaming machine, the gaming machine comprising a gaming controller, a bus, a first memory for storing software for operating one or more games on said machine, a separate memory device, the first memory, controller and separate memory device all being linked to the bus, the bus also being linked to a control station controller located in said casino but at a remote location from said machine, collecting information regarding one or more inputs by said player;

collecting information generated in response to said one or more inputs by said player resulting in the presentation of said game;

creating a session file, said session file including a plurality of data fields;

associating said collected information regarding said one or more inputs by said player and said generated information with said data fields of said session file;

storing said session file and associated collected information in said separate memory device;

analyzing said session file to determine if a triggering event has occurred and, if a triggering event has occurred, sending said session file to the control station controller for replay at said control station controller, wherein triggering events include gaming machine malfunctions and jackpots exceeding a predetermined value;

in the event no triggering event occurs, recreating said game after said game has been played at said machine in said casino upon request by a player or casino representative, said game recreated using information stored in association with said session file.

13. The method in accordance with claim 12 including the step of collecting information regarding the identity of said player and associating information regarding the identity of said player with said session file.

14. The method in accordance with claim 12 including the step of associating collected information regarding one or more games with said single session file.

15. The method in accordance with claim 12 including the step of associating time stamp information with said collected information regarding one or more inputs by said player and said generated information.

16. The method in accordance with claim 12 wherein said generated information includes one or more generated random numbers used to define the outcome of said game.

17. The method in accordance with claim 12 wherein said collected information regarding one or more inputs by said player comprises data representative of one or more keystrokes or button presses by said player at said machine in said casino.

18. The method in accordance with claim 12 including the step of transmitting said session file through the bus to the control system controller or a server linked to the control system controller and recreating said game at said remote location.

19. The method in accordance with claim 12 wherein said gaming device includes a separate player tracking controller in addition to said gaming controller and said collecting steps are performed by said player tracking controller.

20. The method in accordance with claim 12 wherein said gaming machine is operated by a first party and said collecting steps are performed by a second party who operates the control station controller.

21. The method in accordance with claim 20 including the step of transmitting said collected information from the separate memory device through the bus to the control station controller.

* * * * *